United States Patent
Lee et al.

(10) Patent No.: US 10,834,233 B2
(45) Date of Patent: *Nov. 10, 2020

(54) AUTOMATIC MOBILE APPLICATION REDIRECTION

(71) Applicant: MICROSOFT TECHNOLOGY LICENSING, LLC, Redmond, WA (US)

(72) Inventors: Chin-Nan Lee, New Taipei (TW); Hsiang-Fu Liu, Taipei (TW); Shu-Fong Huang, Taipei (TW); Yu-Li Huang, Taipei (TW)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 649 days.

This patent is subject to a terminal disclaimer.

(21) Appl. No.: 15/409,810

(22) Filed: Jan. 19, 2017

(65) Prior Publication Data

US 2017/0134525 A1    May 11, 2017

Related U.S. Application Data

(63) Continuation of application No. 13/648,461, filed on Oct. 10, 2012, now Pat. No. 9,563,713.

(51) Int. Cl.
| | | |
|---|---|---|
| *G06F 15/16* | (2006.01) | |
| *G06F 15/173* | (2006.01) | |
| *H04L 29/08* | (2006.01) | |
| *G06F 16/958* | (2019.01) | |
| *G06F 16/957* | (2019.01) | |
| *H04L 29/06* | (2006.01) | |
| *H04W 88/02* | (2009.01) | |

(52) U.S. Cl.
CPC .......... *H04L 67/34* (2013.01); *G06F 16/9577* (2019.01); *G06F 16/972* (2019.01); *H04L 67/14* (2013.01); *H04L 67/42* (2013.01); *H04W 88/02* (2013.01)

(58) Field of Classification Search
CPC ... G06F 16/9577; G06F 16/972; H04L 67/34; H04L 67/14; H04L 67/42; H04W 88/02
USPC ......................................... 709/217, 219, 239
See application file for complete search history.

(56) References Cited

U.S. PATENT DOCUMENTS

| | | |
|---|---|---|
| 6,763,388 B1 | 7/2004 | Tsimelzon |
| 6,785,707 B2 | 8/2004 | Teeple |
| (Continued) | | |

FOREIGN PATENT DOCUMENTS

WO    2010/094927 A1    8/2010

OTHER PUBLICATIONS

"International Search Report and Written Opinion Issued in PCT Application No. PCT/US2013/064344", dated Dec. 20, 2013, 11 Pages.

(Continued)

*Primary Examiner* — Uzma Alam
*Assistant Examiner* — Sahera Halim

(57) ABSTRACT

Automatic application redirection is provided. Upon receiving a request for a first content object, a determination may be made as to whether the request is associated with a mobile device. In response to determining that the request is associated with the mobile device, the request may be redirected to a second content object.

20 Claims, 7 Drawing Sheets

(56) References Cited

U.S. PATENT DOCUMENTS

| | | | |
|---|---|---|---|
| 7,054,623 B1* | 5/2006 | Cushway | G06F 8/65 455/41.2 |
| 7,251,780 B2 | 7/2007 | Cheng | |
| 7,523,223 B2 | 4/2009 | Chen et al. | |
| 7,636,792 B1* | 12/2009 | Ho | H04L 67/2823 709/200 |
| 7,739,658 B2 | 6/2010 | Watson et al. | |
| 8,122,130 B2 | 2/2012 | Shenfield et al. | |
| 8,595,186 B1* | 11/2013 | Mandyam | G06F 8/38 707/632 |
| 9,563,713 B2* | 2/2017 | Lee | H04L 67/14 |
| 2002/0133616 A1* | 9/2002 | Yoza | H04L 67/2814 709/238 |
| 2006/0062362 A1 | 3/2006 | Davis | |
| 2008/0172372 A1 | 7/2008 | Shacham et al. | |
| 2009/0048913 A1* | 2/2009 | Shenfield | G06Q 30/0248 705/14.47 |
| 2009/0210514 A1* | 8/2009 | Davis | H04L 67/02 709/219 |
| 2011/0082946 A1* | 4/2011 | Gopalakrishnan | H04L 67/2828 709/231 |
| 2011/0099467 A1 | 4/2011 | Kapur et al. | |
| 2011/0167333 A1* | 7/2011 | Sakata | G06F 16/958 715/234 |
| 2012/0054598 A1* | 3/2012 | Lin | G06F 16/9577 715/235 |
| 2012/0059883 A1 | 3/2012 | Yohai-Giochais | |
| 2012/0265802 A1 | 10/2012 | Shen et al. | |
| 2013/0151552 A1 | 6/2013 | Sugawara et al. | |
| 2013/0198331 A1 | 8/2013 | Ho et al. | |
| 2013/0232234 A1 | 9/2013 | Kapur et al. | |
| 2013/0262481 A1 | 10/2013 | Bhandari et al. | |
| 2013/0326333 A1 | 12/2013 | Hashmi | |
| 2013/0339529 A1* | 12/2013 | Rizzo | H04L 67/322 709/226 |
| 2014/0043970 A1 | 2/2014 | Lientz et al. | |

OTHER PUBLICATIONS

Overview of Mobile Pages and the Redirection System, Published on: May 2010, Available at: http://msdn.microsoft.com/en-us/library/ms462572.aspx.

Pearce, James, "A Very Modem Mobile Switching Algorithm—Part II", Published on: Feb. 7, 2009, Available at: http://mobiforge.com/designing/story/a-very-modern-mobile-switching-algorithm-part-ii.

Mobile Device Detection and Redirection With PHP, Published on: Jun. 30, 2010, Available at: http://www.mlynn.org/2010/06/mobile-device-detection-and-redirection-with-php/#.T9giHbDrpid.

"Final Office Action Issued in U.S. Appl. No. 13/648,461", dated Jan. 14, 2015, 12 Pages.

"Final Office Action Issued in U.S. Appl. No. 13/648,461", dated Feb. 2, 2016, 8 Pages.

"Non Final Office Action Issued in U.S. Appl. No. 13/648,461", dated Jul. 16, 2015, 16 Pages.

"Non Final Office Action Issued in U.S. Appl. No. 13/648,461", dated Mar. 28, 2014, 13 Pages.

"Notice of Allowance Issued in U.S. Appl. No. 13/648,461", dated Sep. 28, 2016, 6 Pages.

* cited by examiner

AUTOMATIC MOBILE APPLICATION REDIRECTION

CROSS-REFERENCE TO RELATED APPLICATIONS

This application is a continuation application of U.S. patent application Ser. No. 13/648,461 filed Oct. 10, 2012, now U.S. Pat. No. 9,563,713, entitled "AUTOMATIC MOBILE APPLICATION REDIRECTION" which is hereby incorporated by reference in its entirety.

BACKGROUND

Web sites often offer a mobile version of their affiliated web pages when a user visits the site from a browser on a mobile device, such as a tablet or cellular phone. Such mobile sites may be designed with a small screen size and/or limited feature set in mind. Redirection software may allow an automatic redirection to such mobile versions when the mobile device browser is detected, such as by a browser identifier sent in the headers of a request for a page on the web site. Users may sometimes wish to switch between the mobile version and the full version of the web site, however, such as when the mobile version does not provide an identical feature set. Furthermore, not all devices are correctly recognized, so users may need to switch between the mobile and full versions manually instead of waiting for a fix.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Automatic application redirection may be provided. Upon receiving a request for a first content object, a determination may be made as to whether the request is associated with a mobile device. In response to determining that the request is associated with the mobile device, the request may be redirected to a second content object.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
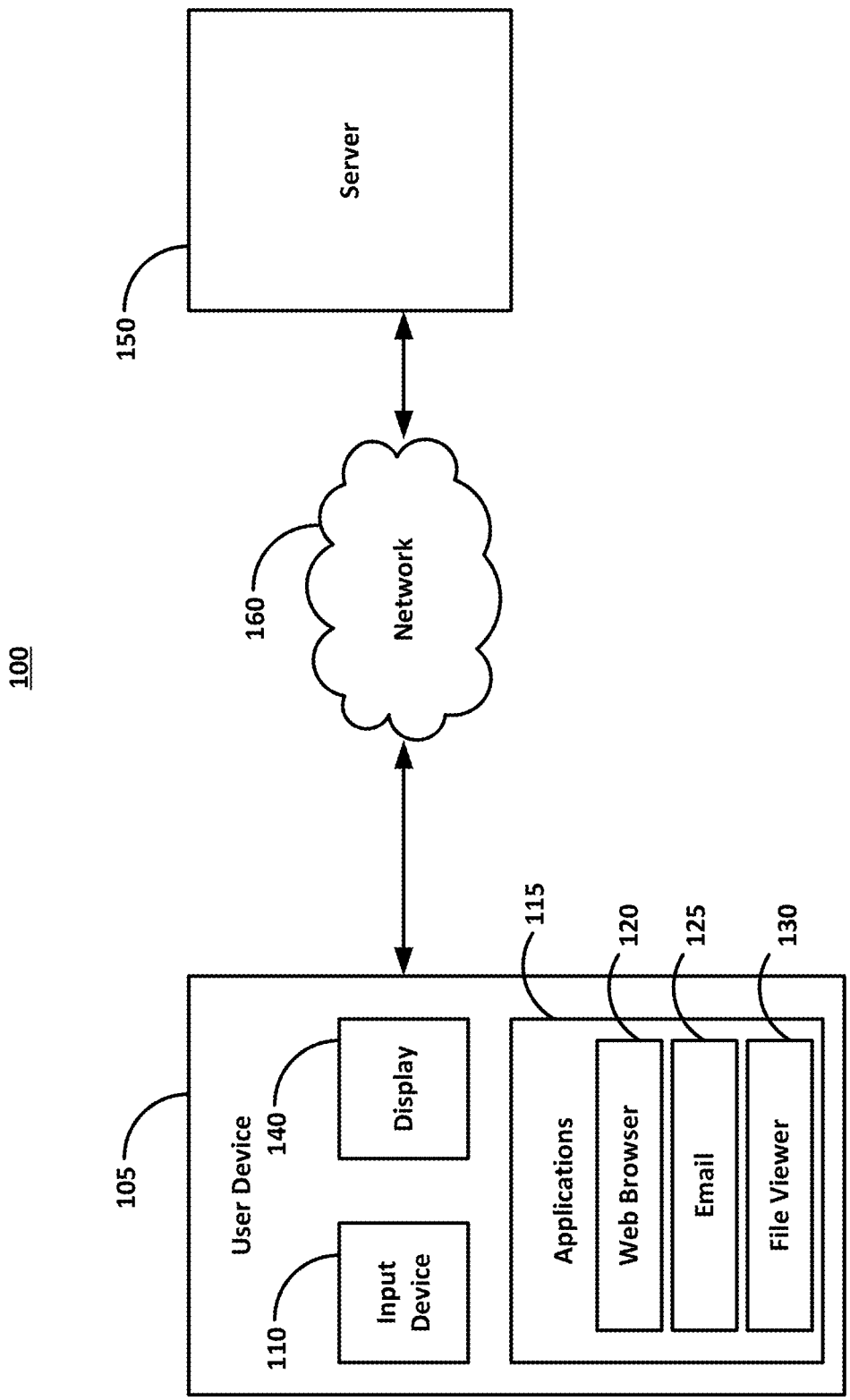
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

When people access content using various mobile devices, such as smartphones, they sometimes see content optimized for a standard monitor rather than for a small screen size. Content providers need a way to tell how to show their content optimized for the particular user agent (e.g., a web browser.) In some cases, the user agent may provide some information identifying the device or browser version enabling a web server to provide at least a general entry point. The standard version of the content may also provide a link to the mobile version, and vice versa, that the user may select to change versions.

The content request may comprise further information such as a type of document being requested and a location path for the content. Various parameters, structured as key/value pairs, may also be included in the request. These factors may be integrated into a signature associated with the request that may be used, with and/or without the identifying information described above, to allow for a two-way redirection of the content request at a granular level.

For example, when a mobile smartphone user receives an e-mail from someone else and there is a link in that e-mail to some content, the user may tap on the link in the e-mail and the link redirects the user to a browser. The smartphone opens a browser to show the related content. The link, if the e-mail is sent from a standard desktop computer, may be to a version of the content designed for display on a standard monitor. In this case, an automatic mobile browser redirection may catch the link and translate the link to a corresponding mobile link in order to show the mobile version of the content to smartphone users. Consistent with embodiments of this disclosure, a cookie may be set on the browser application to save any decisions regarding whether a standard or mobile view of requested content should be provided to a given device.

Each request for content may be evaluated to determine whether the request comprises any mobile characteristics, such as particular file types, location paths, software versions, and/or hardware identifiers. If so, the request may be automatically redirected to a corresponding mobile version of the content, such as a web page comprising a condensed layout, a lower resolution image or video file. The request may also be evaluated to determine whether the mobile device has the necessary capabilities to display the requested content and. If not, redirect the request to load a software application capable of viewing the file. For example, a request to view a spreadsheet from a web browser application may be redirected to launch a spreadsheet application in order to display the spreadsheet content.

Configuration options may allow the user to specify that they wish to view standard version of content. For example, the content request may comprise a header associated with a configuration property specifying that this particular user does not wish to be redirected to mobile content. In such a case, the redirect may be bypassed to avoid blocking the user's intention to see the standard view.

FIG. 1 is a block diagram of an operating environment 100 that may provide automatic application redirection. Operating environment 100 may comprise a user device 105 comprising an input device 110, such as a physical and/or soft keyboard, a touchscreen, a trackpad, a mouse, a camera, and/or a microphone. User device 105 may be operative to execute a plurality of applications 115, such as a web browser 120, an email application 125, and/or a file viewer 130. User device 105 may further comprise a display 140 operative to display information and receive user inputs associated with plurality of applications 115. User device 105 may be operative to communicate with other computing devices, such as transmitting content requests to a server 150 via a network 160 and receiving results from server 150 for output to display 140.

Figures 2A, 2B:
FIGS. 2A-2B are illustrations of a user interface being redirected.

FIG. 2A is an illustration of a user interface 200 as may be displayed on display 140 of user device 105. User interface 200 may display an email application 210 comprising a link 220 to data stored on a remote computing device such as server 150. Upon selection of link 220 by the user, a request for the content referenced by link 220 may be transmitted to server 150 via network 160.

FIG. 2B is an illustration of user interface 200 after receiving a redirect from server 150. In conventional desktop computing devices, selection of link 220 may result in downloading the file to the computing device and allowing the user to open the file in an application of their choosing. In many mobile devices, files may be unable to be downloaded to a common storage location, so server 150 may redirect user device 105 to execute file viewer 130 in order to open the file referenced by link 220 and display a plurality of data 230 contained within. The redirection may be based on a user agent string within the request and/or the Uniform Resource Locator (URL) signature. The redirection can thus be more granular than page-level. For example, a request for the same web page with a different parameter or location path can have different redirection behavior. In addition, the redirection can be bi-directional even in above-described granularity. That is, a standard view can be redirected to and from a mobile view.

Figure 3:
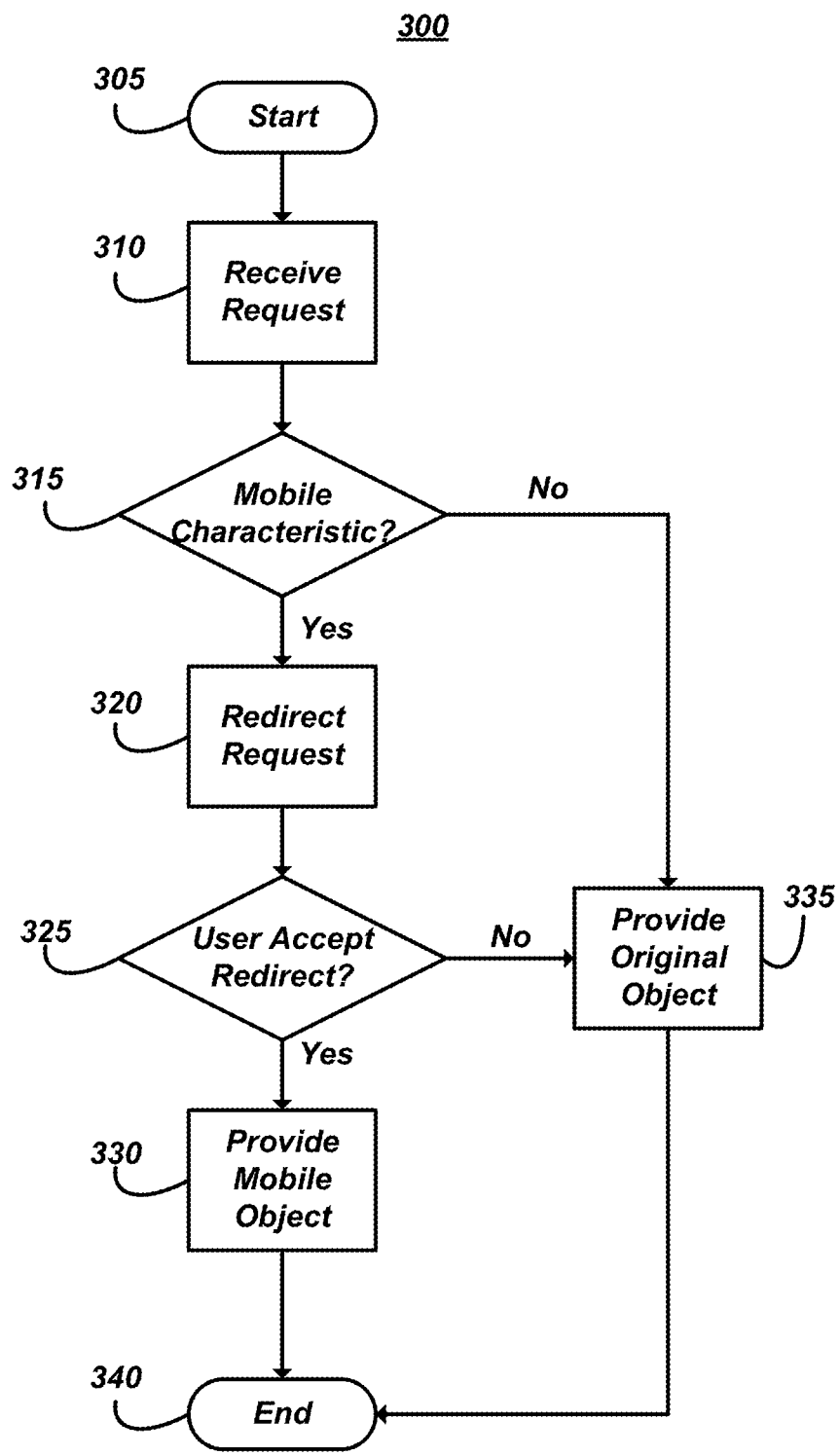
FIG. 3 is a flow chart of a method for providing automatic application redirection.

FIG. 3 is a flow chart setting forth the general stages involved in a method 300 consistent with an embodiment of the disclosure for providing automatic application redirection. Method 300 may be implemented using a computing device 400 as described in more detail below with respect to FIG. 4. Ways to implement the stages of method 300 will be described in greater detail below. Method 300 begins at starting block 305 and proceeds to stage 310 where computing device 400 may receive a request for a content object. For example, server 150 may receive a request for a web page from user device 105.

Method 300 may then advance to stage 315 where computing device 400 may determine whether the request comprises at least one mobile characteristic. For example, server 150 may determine whether the request is associated with a mobile version of an application, and/or whether the request comprises a hardware identifier associated with a mobile device, a web browser cookie identifying a previous decision to provide mobile version in responses to requests from the device, a parameter associated with the request indicating that a mobile version of the content should be provided, a configured property regarding a preference of the user with respect to mobile versions, and/or a location path to a mobile version of the first content object.

In response to determining that the request is associated with the mobile device, method 300 may advance to stage 320 where computing device 400 may redirect the request to a second content object. For example, server 150 may provide a second web page comprising a mobile version of an originally requested web page, and/or server 150 may direct user device 105 to launch file viewer 130 to view a requested file rather than simply transmitting a requested file. In such cases, the second content object may comprise at least one common element with the first content object, such as web page content and/or file contents.

Method 300 may then advance to stage 325 where computing device 400 may determine whether a user of the device accepted the redirect to the second content object. For example, server 150 may determine whether the user requested the first content object again and/or whether a previously configured user preference excluding redirects to mobile versions was received with the request and/or in response to the redirect. For another example, user device 105 may display a notification of the redirect and may receive a response to the notification indicating that the user rejected the redirect.

In response to determining that the user of the device did not accept the redirect to the second content object, or if the request is determined not to comprise a mobile characteristic at stage 315, method 300 may advance to stage 335 where computing device 400 may providing the first content object to the device.

Otherwise, method 300 may advance to stage 330 where computing device 400 may provide the second content object comprising a mobile version of the first content object. Method 300 may then end at stage 340.

An embodiment consistent with the invention may comprise a system for providing automatic application redirection. The system may comprise a memory storage and a processing unit coupled to the memory storage. The processing unit may be operative to receive a request for a first content object, determine whether the request is associated with a mobile device, and, in response to determining that the request is associated with the mobile device, redirect the request to a second content object.

Another embodiment consistent with the invention may comprise a system for providing automatic application redirection. The system may comprise a memory storage and a processing unit coupled to the memory storage. The processing unit may be operative to receive a request for a first content object, determine whether the request is associated with a mobile device, and, in response to determining that the request is associated with the mobile device, redirect the request to a second content object, wherein the at least one second content object shares at least one element with the first content object.

Figure 4:
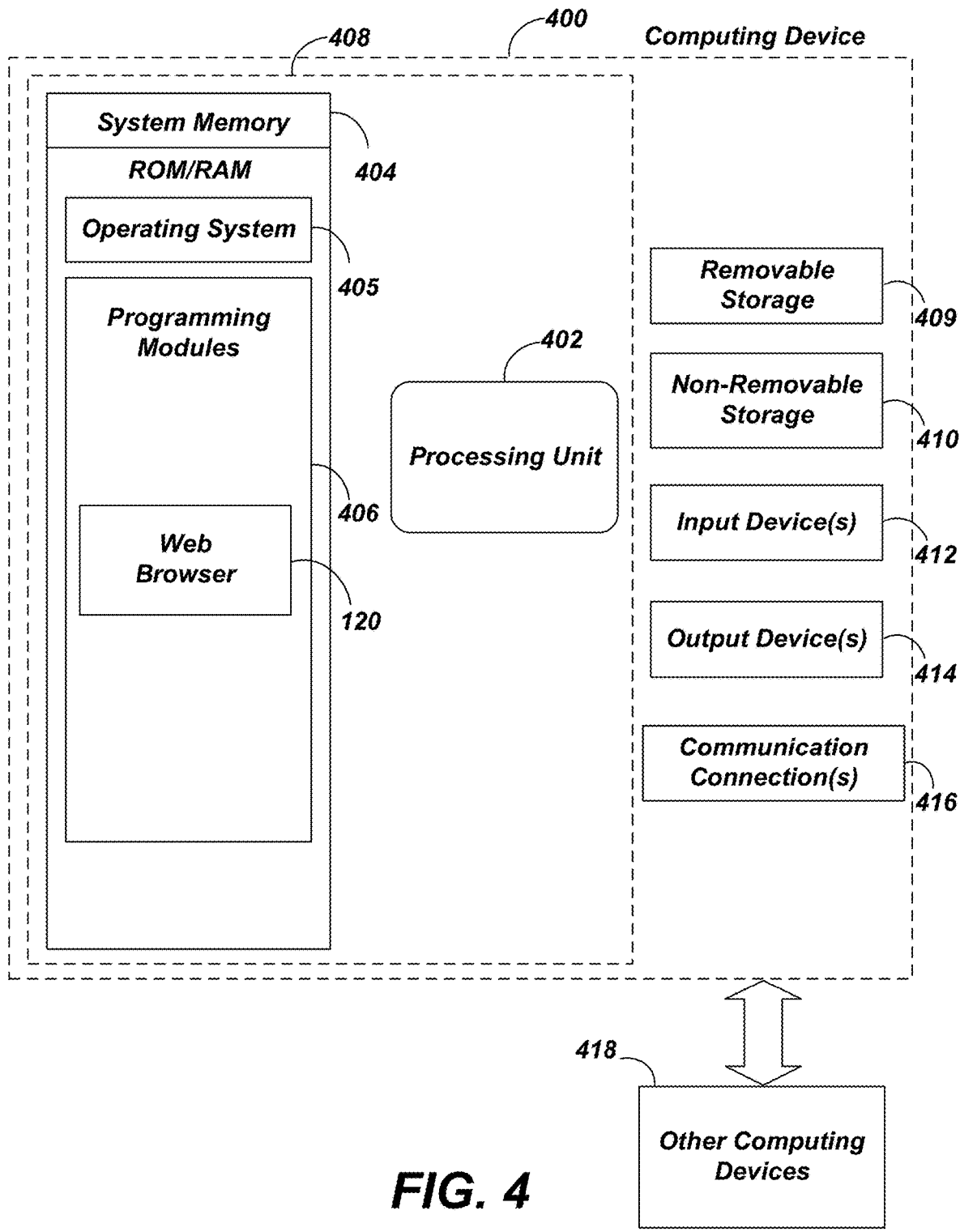
FIG. 4 is a block diagram of a computing device.

Yet another embodiment consistent with the invention may comprise a system for providing automatic application redirection. The system may comprise a memory storage and a processing unit coupled to the memory storage. The processing unit may be operative to receive a request for a first content object from a device and determine whether the request comprises at least one mobile characteristic. Mobile characteristic may comprise, for example, a version of an application executing on the device (e.g., a web browser version known to be designed for mobile devices), a hardware identifier associated with the device, a web browser cookie stored on the device, a parameter associated with the request, a configured property associated with the device, and/or a location path of the first content object. In response to determining that the request comprises a mobile characteristic, the processing unit may be operative to redirect the request to a second content object, wherein the second content object comprises at least one common element with the first content object, and determine whether a user of the device accepted the redirect to the second content object. Determining whether the user of the device accepted the redirect to the second content object may comprise, for example, determining whether the user requested the first content object again, receiving a previously configured user preference, and/or receiving a response to a displayed notification of the redirect to the second content object. In response to determining that the user of the device did not accept the redirect to the second content object, the processing device may be operative to provide the first content object to the device FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise user device 105 and/or server 150 as described above. Methods described in this specification may operate in other environments and are not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may comprise, for example, web browser 120. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., translation API 120) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
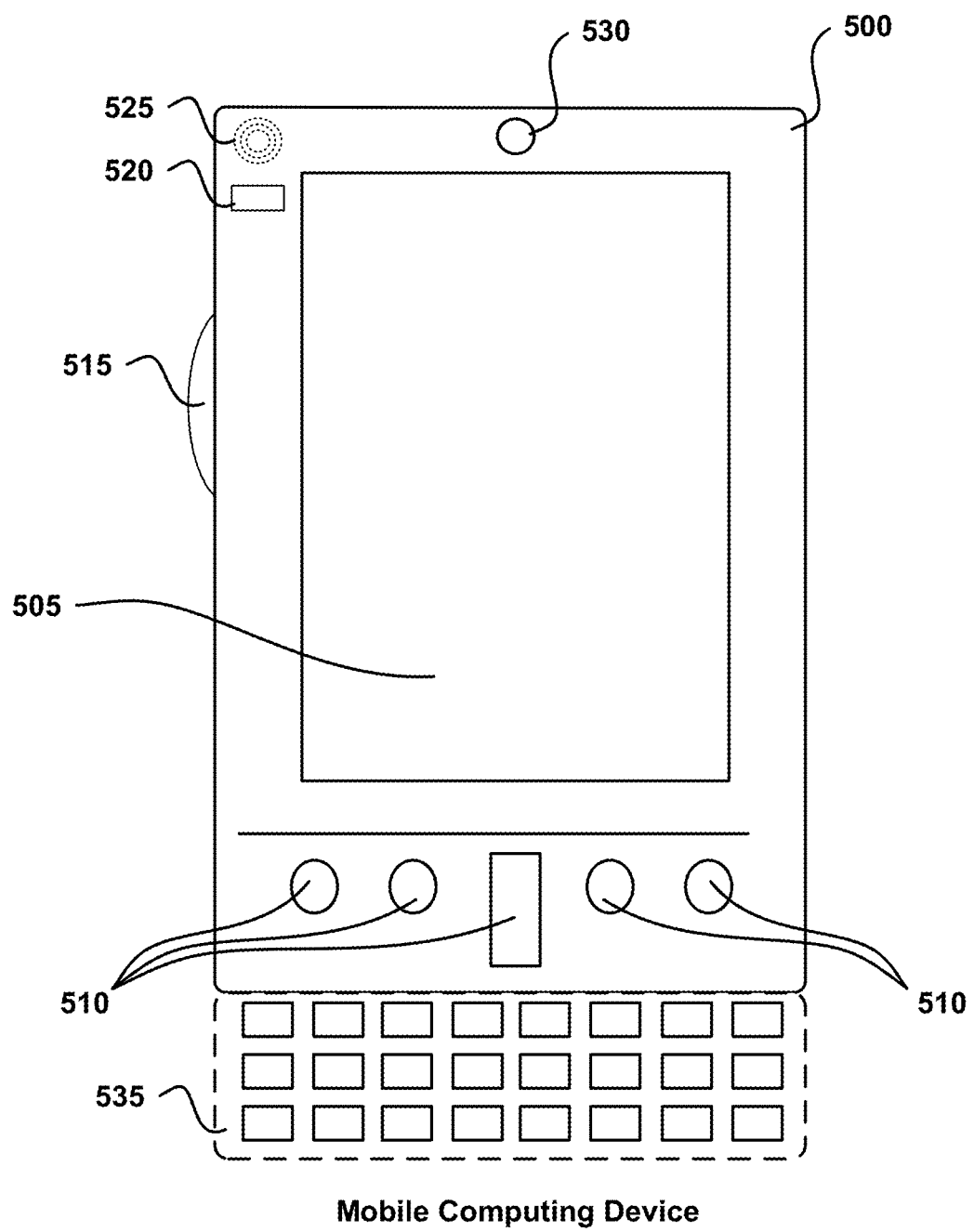
FIGS. 5A-5B are simplified block diagrams of a mobile computing device with which embodiments of the present disclosure may be practiced.
Figure 5B:
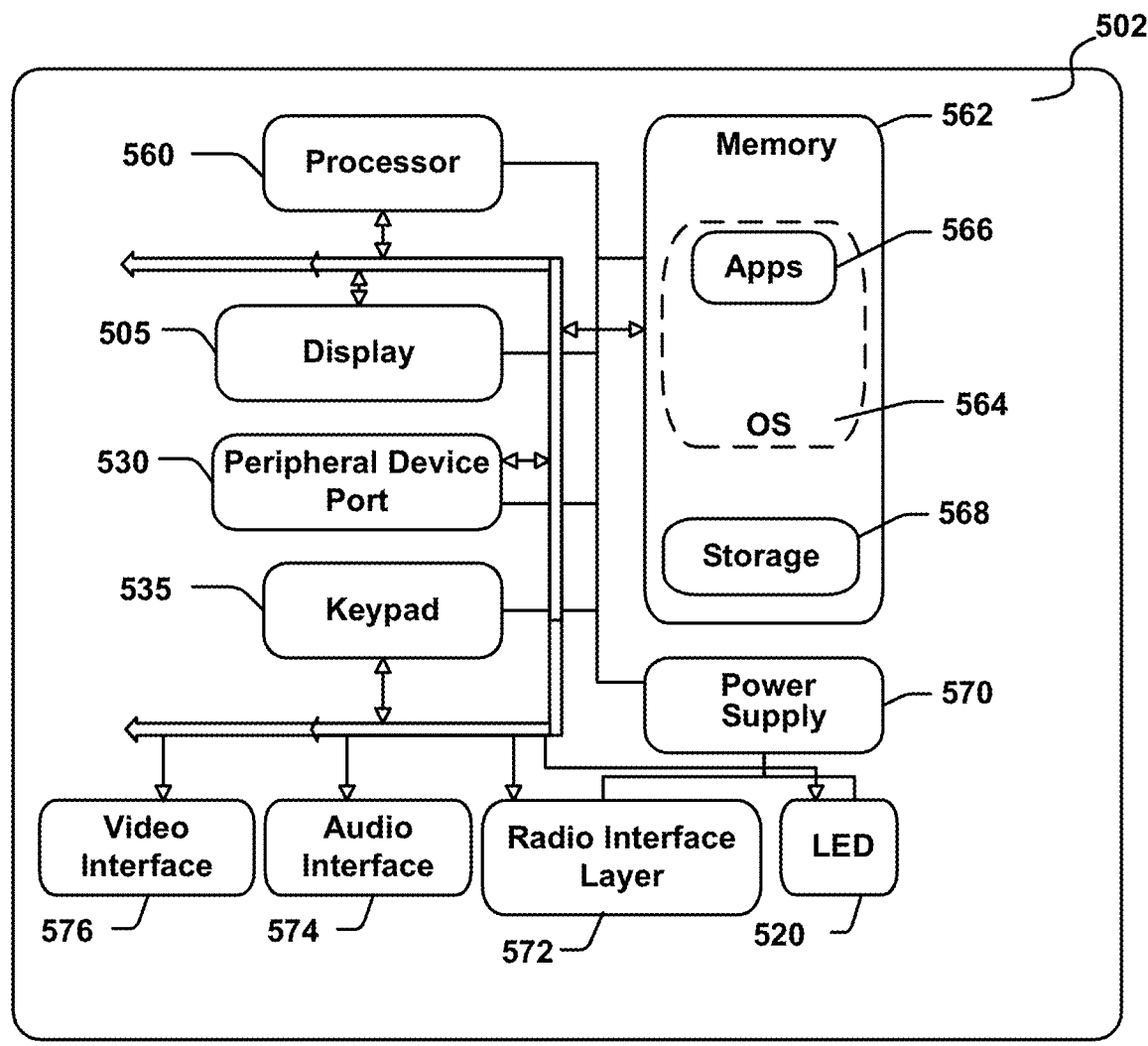

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
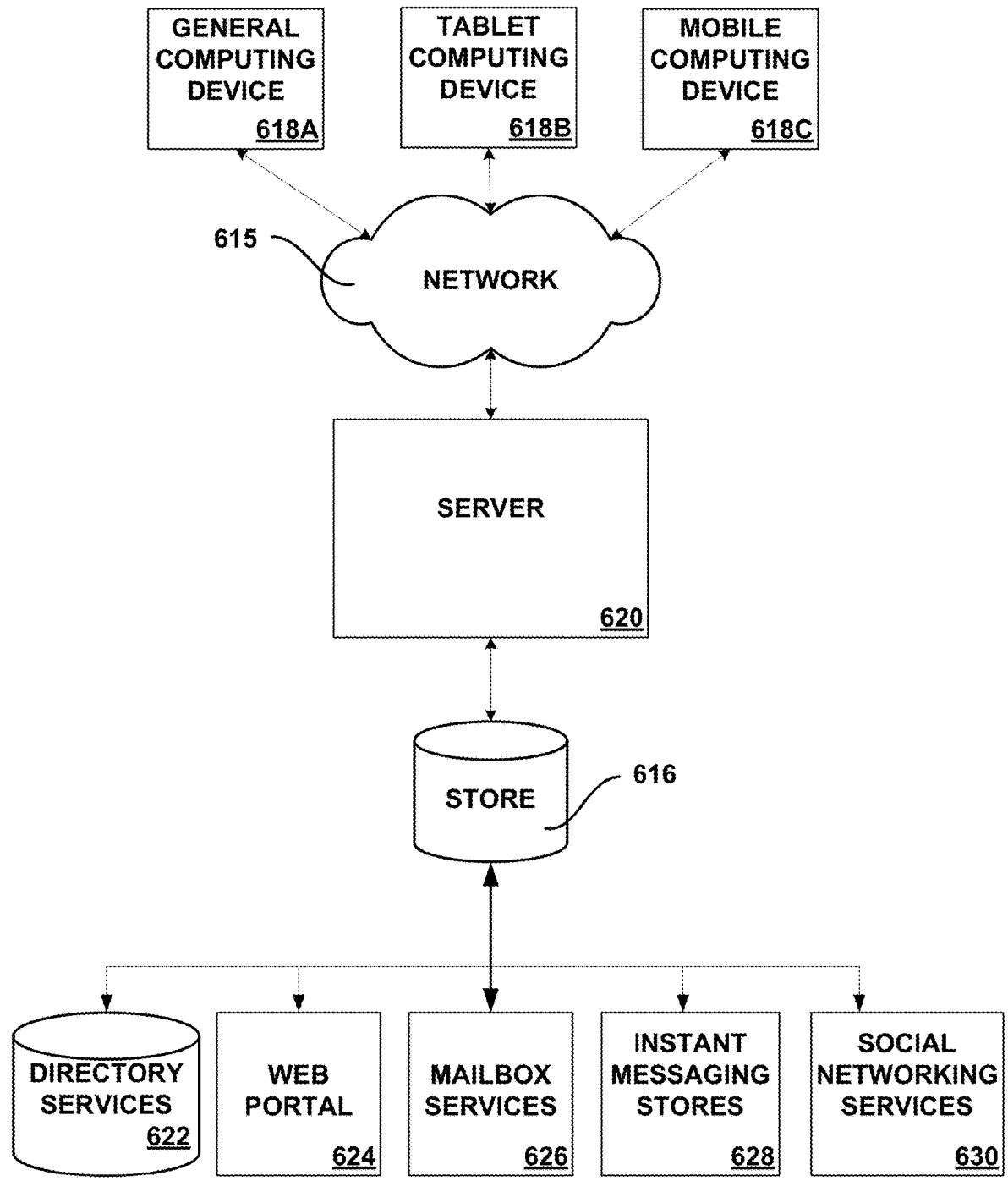
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618a, a tablet computing device 618b and/or a mobile computing device 618c (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Assignee. The Assignee retains and reserves all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing automatic application redirection, the method comprising:
   receiving, by a server, a request for a first content object, wherein the request comprises a hardware identifier for a mobile device communicating with the server, and wherein the first content object comprises a non-mobile version of content;
   determining the request identifies a mobile characteristic of the mobile device based on the hardware identifier;
   determining, by the server, whether the mobile device is configured with a preference to exclude redirection of the request to a second content object in place of the first content object;
   in response to determining the request identifies the mobile characteristic and determining that the mobile device is not configured with the preference to exclude redirection to the second object, providing, by the server, the second content object without having received a request for the second content object; and
   in response to determining that the mobile device is configured with the preference to exclude redirection to the second content object, providing, by the server, the first content object to the mobile device.

2. The method of claim 1, wherein the user configuring the preference to exclude redirection comprises configuring the preference to exclude redirection to mobile versions of content objects.

3. The method of claim 1, wherein configuring the preference to exclude redirection comprises receiving the preference to exclude redirection along with the request for the first content object.

4. The method of claim 1, wherein configuring the preference to exclude redirection comprises configuring the preference to exclude redirections in response to redirecting the request from the mobile device to the second content object.

5. The method of claim 1, wherein configuring the preference to exclude redirection comprises configuring the preference to exclude redirection to mobile devices.

6. The method of claim 1, wherein the mobile device comprises at least one of the following: a cellular telephone, a smartphone, a handheld gaming device, a netbook, a laptop computer, and a tablet computer.

7. The method of claim 1, wherein determining whether the request is associated with the mobile device comprises identifying a version of an application executing on the mobile device.

8. The method of claim 7, wherein the application comprises at least one of the following: a web browser and an operating system.

9. The method of claim 1, further comprising opening a website on a browser on the mobile device to request the first content object, wherein the request for the first content object is a request for a first mobile application, and in response to redirecting the request for the first mobile application a second mobile application is provided.

10. The method of claim 1, wherein the first content object comprises a first web page and the second content object comprises a second web page comprising a formatting associated with a display of the mobile device.

11. The method of claim 10, wherein the first web page and the second web page share at least one content element.

12. The method of claim 10, further comprising dynamically generating the second web page according to the request for the first content object.

13. The method of claim 12, further comprising identifying at least one functionality enabled on the mobile device, and wherein dynamically generating the second web page comprises generating the second web page comprising the at least one functionality enabled on the mobile device.

14. A mobile computing device, comprising:
   a browser for accessing and displaying content on a display of the mobile computing device;
   a preference which may be configured to exclude redirection via the browser;
   a user interface displayed on the display for receiving user selections;
   an input device for receiving a selection via the user interface for the mobile computing device to transmit a request for a first content object for display; and
   a processing unit operable to:
      generate a request for a first content object, wherein the request identifies a mobile characteristic for the mobile computing device communicating, and wherein the first content object comprises a non-mobile version of content;
      when it is determined that the request identifies the mobile characteristic and a preference to exclude redirection of the browser to the second object is not selected, receive the second content object in place of the first content object; and
      when it is determined that the preference to exclude redirection of the browser to the second content object is selected, receive the first content object.

15. The mobile computing device of claim 14, wherein the processing unit operates to open a website on a browser on the mobile device to request the first content object, wherein the request for the first content object is a request for a first mobile application, and in response to redirecting the request for the first mobile application a second mobile application is provided.

16. The mobile computing device of claim 14, wherein the processing unit operates to determine whether the preference excludes redirection to mobile versions of content objects.

17. The mobile computing device of claim 14, wherein the processing unit operates to determine whether the preference excludes redirection in response to receipt of the preference included with the request for the first content object.

18. The mobile computing device of claim 14, wherein the processing unit operates to determine whether the preference excludes redirection in response to redirecting the request from the mobile computing device to the second content object.

19. The mobile computing device of claim 14, wherein the processing unit operates to determine whether the preference excludes redirection to mobile devices.

20. A computer-readable device which stores a set of instructions which when executed performs a method for providing automatic application redirection, the method executed by the set of instructions comprising:
- receiving, by a server, a request for a first content object, wherein the request comprises a hardware identifier for a mobile device communicating with the server, and wherein the first content object comprises a non-mobile version of content;
- determining the request identifies a mobile characteristic of the mobile device based on the hardware identifier;
- determining, by the server, whether the mobile device is configured with a preference to exclude redirection of the request to a second content object in place of the first content object;
- in response to determining the request identifies the mobile characteristic and determining that the mobile device is not configured with the preference to exclude redirection to the second object, providing, by the server, the second content object without having received a request for the second content object; and
- in response to determining that the mobile device is configured with the preference to exclude redirection to the second content object, providing, by the server, the first content object to the mobile device.

* * * * *